(12) United States Patent
Ugolini

(10) Patent No.: US 9,186,969 B2
(45) Date of Patent: Nov. 17, 2015

(54) CAR WITH A RIGID SUN ROOF, PREFERABLY WITH FOUR SEATS

(71) Applicant: Ferrari S.p.A., Modena (IT)

(72) Inventor: Riccardo Ugolini, San Lazzaro di Savena (IT)

(73) Assignee: Ferrari S.p.A., Modena (IT)

( * ) Notice: Subject to any disclaimer, the term of this patent is extended or adjusted under 35 U.S.C. 154(b) by 0 days.

(21) Appl. No.: 14/228,943

(22) Filed: Mar. 28, 2014

(65) Prior Publication Data

US 2014/0292019 A1 Oct. 2, 2014

(30) Foreign Application Priority Data

Mar. 29, 2013 (IT) ................ BO2013A0137

(51) Int. Cl.

| | |
|---|---|
| *B60J 7/14* | (2006.01) |
| *B60J 1/10* | (2006.01) |
| *B60J 1/17* | (2006.01) |
| *B60J 1/18* | (2006.01) |
| *B60J 7/20* | (2006.01) |

(52) U.S. Cl.
CPC .. *B60J 7/146* (2013.01); *B60J 1/10* (2013.01); *B60J 1/17* (2013.01); *B60J 1/183* (2013.01); *B60J 7/205* (2013.01)

(58) Field of Classification Search
CPC .............. B60J 7/205; B60J 7/146; B60J 1/10; B60J 1/17; B60J 1/183
USPC ............. 296/107.07, 107.17, 107.08, 107.01, 296/107.16
See application file for complete search history.

(56) References Cited

U.S. PATENT DOCUMENTS 8,220,861 B2 * 7/2012 Czornyj et al. .......... 296/107.01

FOREIGN PATENT DOCUMENTS

| | | |
|---|---|---|
| DE | 197 52 068 A1 | 5/1999 |
| DE | 103 45 123 A1 | 6/2005 |
| DE | 10 2004 005 591 A1 | 8/2005 |
| DE | 10 2005 002 935 A1 | 7/2006 |
| DE | 10 2005 004 531 A1 | 8/2006 |
| DE | 10 2008 021 508 A1 | 11/2009 |
| EP | 1 882 605 A1 | 1/2008 |
| EP | 1 912 815 B1 | 3/2010 |
| EP | 2 102 025 B1 | 5/2010 |
| EP | 2 554 418 A1 | 2/2013 |

* cited by examiner

*Primary Examiner* — Joseph D Pape
*Assistant Examiner* — Dana Ivey
(74) *Attorney, Agent, or Firm* — Dickstein Shapiro LLP

(57) ABSTRACT

A car having: a passenger compartment, a frame provided with two external vertical posts, which project from the belt line of the car, are arranged facing each other on opposite sides of the car, and form a rear delimitation of the passenger compartment; an openable rigid sun roof provided with two rigid roof members; a baggage compartment arranged in the rear position to contain the openable rigid sun roof when the roof is arranged in an open position; a mobile cover to close the baggage compartment; a rear window which is arranged between the two external vertical posts and is slidably mounted; and a pair of lateral glasses which project from the belt line of the car, are arranged facing each other on opposite sides of the car, lay at the back against the corresponding external vertical posts, and constitute a lateral delimitation of the passenger compartment.

25 Claims, 14 Drawing Sheets

CAR WITH A RIGID SUN ROOF, PREFERABLY WITH FOUR SEATS

FIELD OF THE INVENTION

The present invention relates to a car with an openable rigid sun roof.

DESCRIPTION OF THE RELATED ART

Patent EP1912815B1 and patent EP2102025B1 describe a car with an openable rigid sun roof, wherein the frame comprises two fixed vertical posts, which are arranged facing each other on opposite sides of the car at a border area between a passenger compartment and a rear engine compartment. The openable rigid sun roof comprises a pair of rigid roof elements which are mechanically connected to the frame by means of respective connecting elements arranged at the inner walls of the two vertical posts.

In cars described in patents EP1912815B1 and EP2102025B1, the passenger compartment does not have a particularly large volume in the rear area thereof (especially in the vertical direction) and thus is not able to also accommodate rear seats, maintaining well balanced and thus aesthetically pleasing overall proportions of the body.

SUMMARY OF THE INVENTION

The object of the present invention is to provide a car with openable rigid sun roof which allows a particularly spacious passenger compartment (and therefore potentially able to accommodate four seats, two front and two rear) to be obtained while maintaining well balanced and thus aesthetically pleasing overall proportions of the body.

According to the present invention, a car with openable rigid sun roof is provided according to the appended claims.

BRIEF DESCRIPTION OF THE DRAWINGS

The present invention will now be described with reference to the accompanying drawings, which show some non-limiting embodiment examples thereof, in which.

PREFERRED EMBODIMENTS OF THE INVENTION

Figure 1:
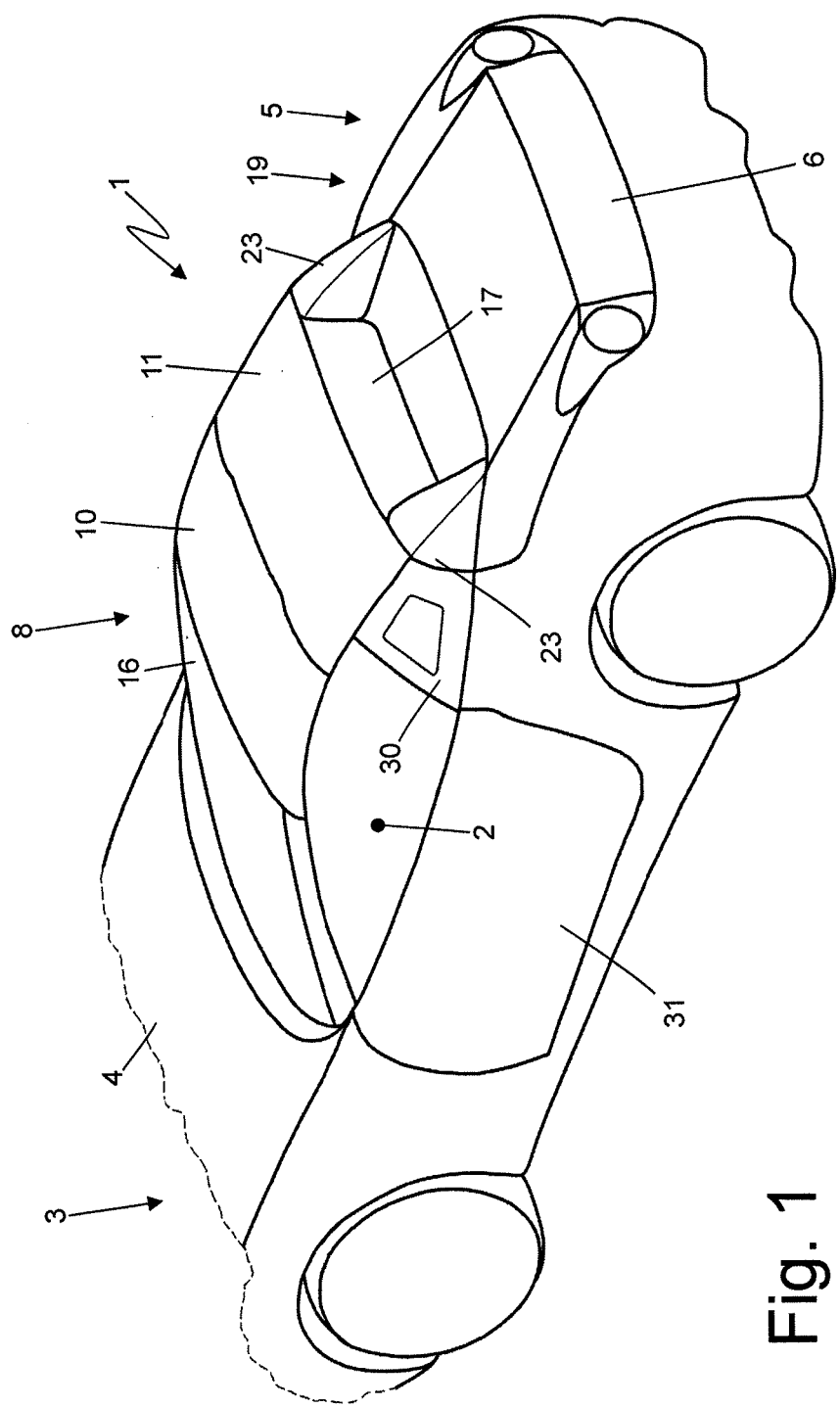
FIG. 1 is a schematic perspective view of a car with openable rigid sun roof which is made according to the present invention and has the sun roof in a closed position.

In FIG. 1, reference numeral 1 shows a car as a whole having a four-seat (two front and two rear) passenger compartment 2, an engine compartment 3 arranged in the front position (i.e. in front of compartment 2) and closed by an engine bonnet 4, and a baggage compartment 5 (or trunk) arranged in the rear position (i.e. behind compartment 2) and closed by a baggage bonnet 6. A frame 7 (a part whereof is shown in FIGS. 9 and 10) of car 1 supports an openable rigid sun roof 8, which can be arranged in an open position (shown in FIGS. 2 and 6-7) in which the passenger compartment 2 is exposed, or in a closed position (shown in FIGS. 1 and 3-4) in which the passenger compartment 2 is covered by the openable rigid sun roof 8.

Figure 8:
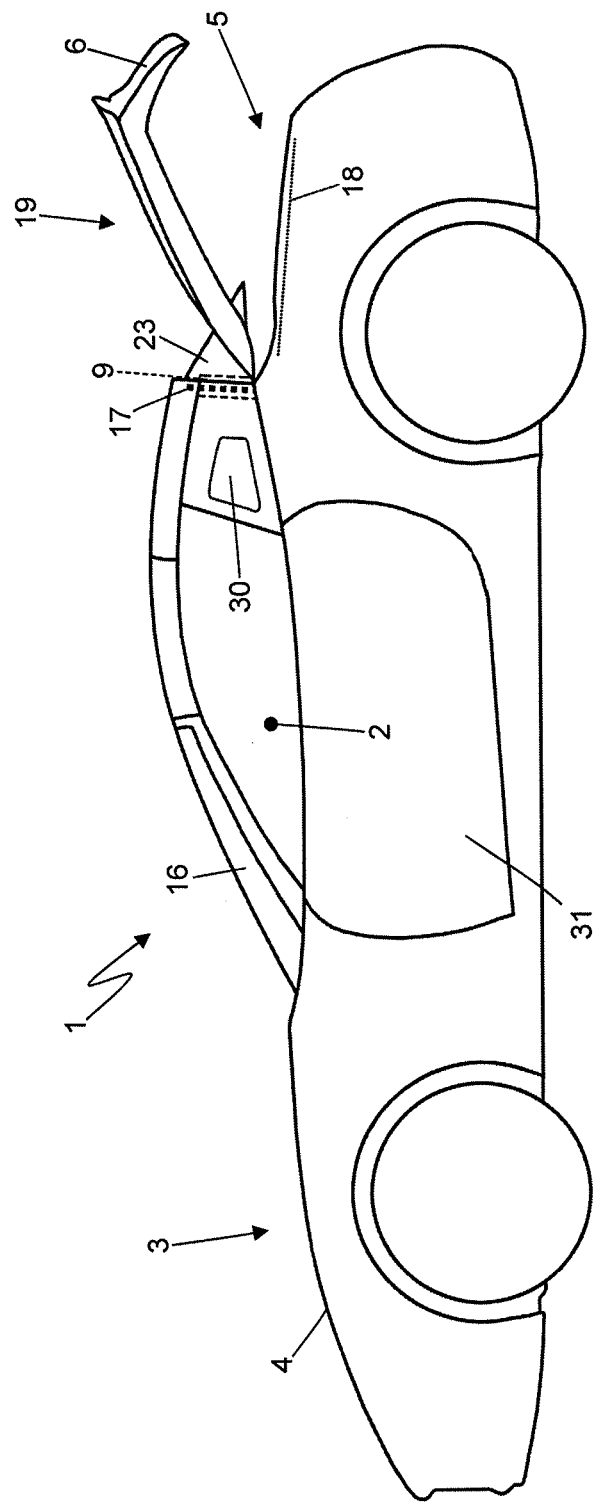
FIG. 8 is a schematic lateral view of the car in FIG. 1 with baggage bonnet open.
Figure 9:
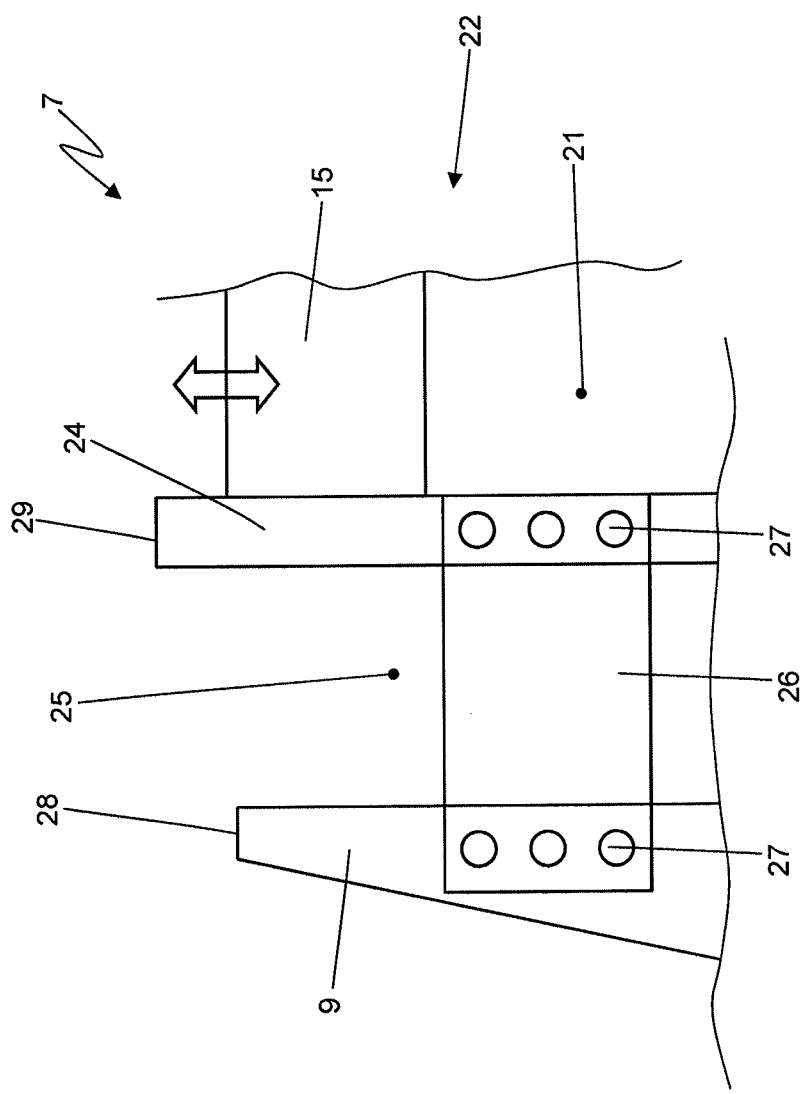
FIG. 9 is a schematic rear view of a detail of an external post and an internal post of the frame of the car in FIG. 1.
Figure 10:
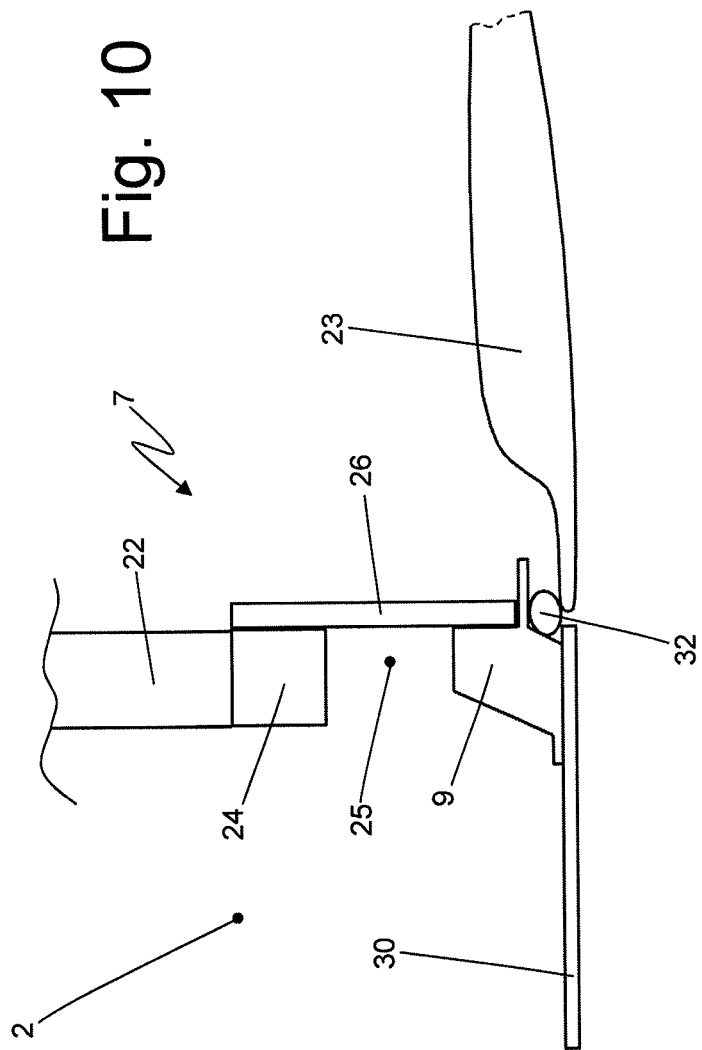
FIG. 10 is a schematic top view of a detail of the external post and the internal post in FIG. 9.

As shown in FIGS. 8 and 9, frame 7 comprises two vertical fixed external posts 9, which are rigidly connected to the remainder of frame 7 in a fixed position (i.e. they have no movement with respect to the remainder of frame 7), vertically project from the belt line of car 1 and are arranged facing each other on opposite sides of car 1 at a border area between the passenger compartment 2 and the baggage compartment 5.

Figure 2:
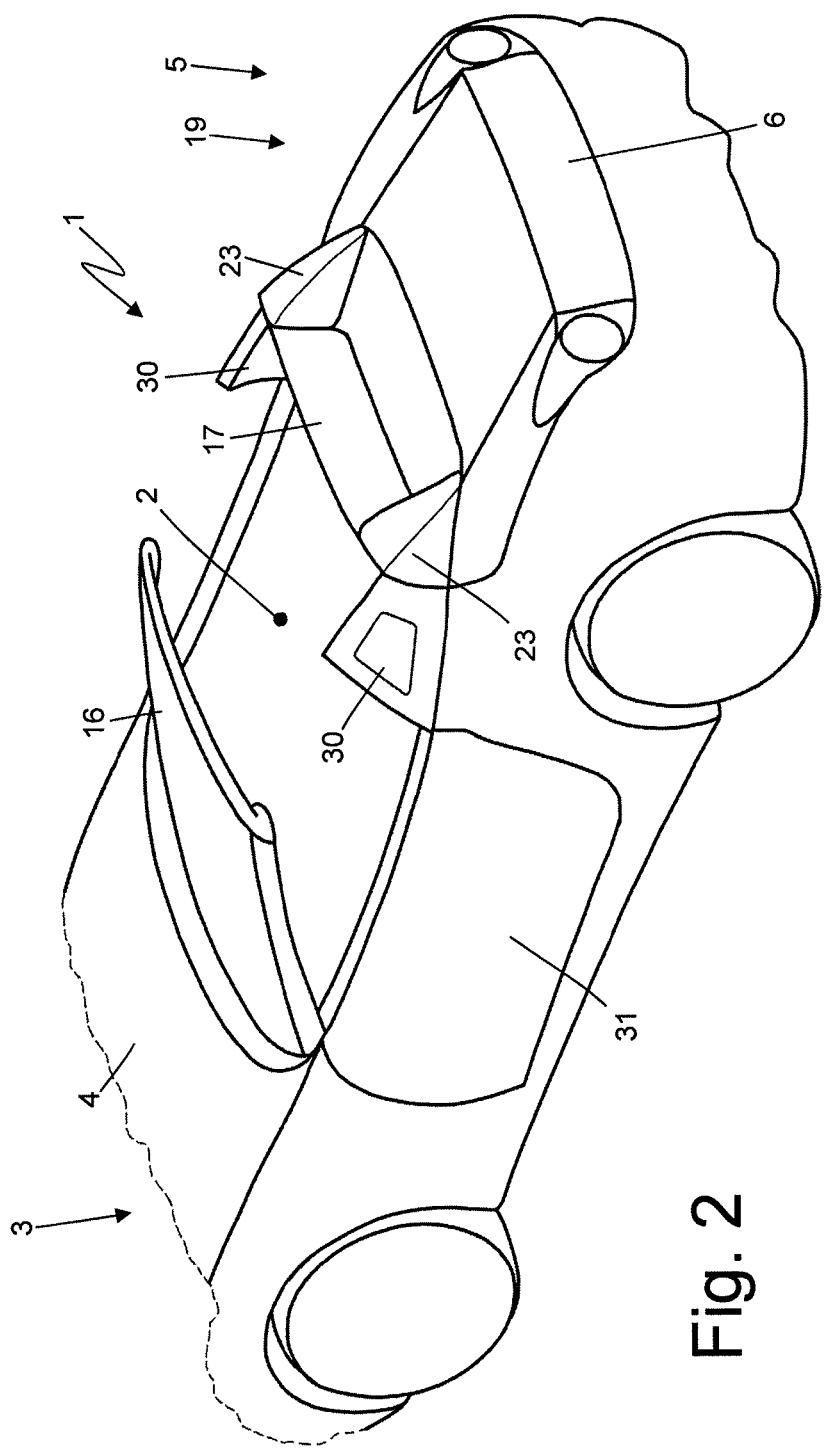
FIG. 2 is a schematic perspective view of the car in FIG. 1 with the sun roof open.
Figure 3:
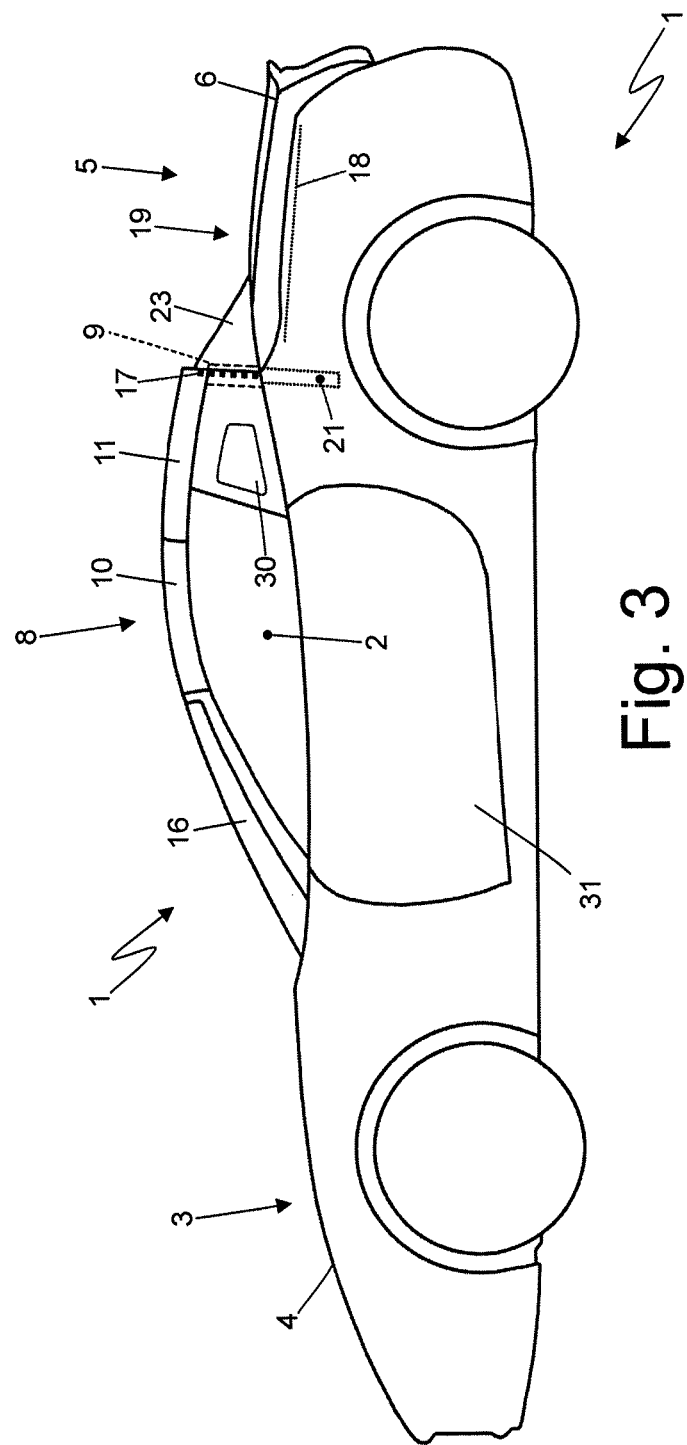
FIGS. 3-7 are a series of schematic and side lateral views of the car in FIG. 1 during successive steps of the sun roof opening.
Figure 5:
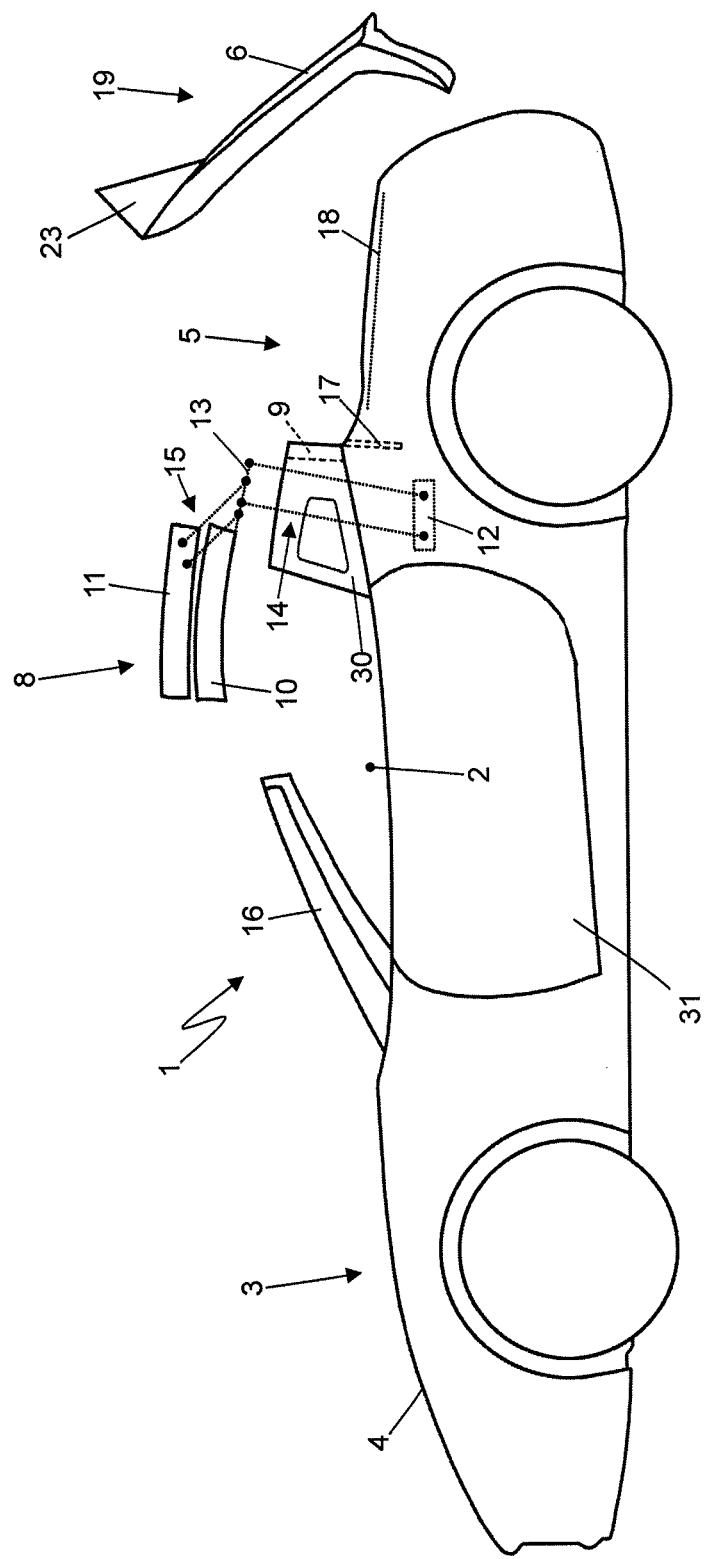

As shown in FIGS. 1 and 2, the openable rigid sun roof 8 comprises a pair of rigid roof members 10 and 11 (i.e. the openable rigid sun roof 8 comprises two and only two rigid roof members 10 and 11). The rigid roof members 10 and 11 are substantially flat, that is, the roof members 10 and 11 have a flat development (free from parts or appendages which project from the plane) and have reduced longitudinal and transverse bulges which are strictly necessary to have an adequate connection with other parts of the body. As shown in FIG. 5, the roof members 10 and 11 are carried by frame 7 by a pair of supporting members (schematically shown in FIG. 5), which are arranged on opposite sides of the roof members 10 and 11 at internal walls of the two external vertical posts 9 (i.e. the supporting members are arranged within the volume laterally delimited by the two external vertical posts 9).

As shown in the embodiment in FIG. 5, the supporting members of the roof members 10 and 11 are fixed to a bearing member 12 (for example, a bearing plate) which is rigidly fixed to frame 7 and is preferably arranged below the belt line at the external vertical posts 9.

The front roof member 10 has a rear appendage 13 which is rigidly fixed to the front roof member 10 and is mechanically connected to the supporting member 12 by a pair of articulated quadrilaterals 14 (only one of which is shown in FIG. 5) which are arranged on opposite sides of the front roof member 10 and constitute the supporting members of the front roof member 10. Moreover, the rear roof member 11 is mechanically connected to the supporting member 12 by a pair of articulated quadrilaterals 15 (only one of which is shown in FIG. 5) which are arranged on opposite sides of the rear roof member 11 and constitute the supporting members of the rear roof member 11; in particular, each articulated quadrilateral 15 is hinged to a rear appendage 13 of the front roof member 10 and is therefore indirectly connected to the supporting member 12 through the interposition of the rear appendage 13. It is important to note that the method of connection of the roof members 10 and 11 to the supporting member 12 (i.e. to frame 7), or the shape of the supporting members of the roof members 10 and 11 may be different: for example, also the rear roof member 11 could be directly connected to the supporting member 12 by means of respective articulated quadrilaterals which are completely separate and independent from the front roof member 10, or the rear roof member 11 may be hinged to the front roof member 10; or alternatively, at least a part of the articulated quadrilaterals which determine a rotary-translation movement could be replaced by simple levers which determine a movement of pure rotation.

According to alternative embodiments perfectly equivalent to one another, the supporting members could make the front roof member 10 carry out a rotation about a fixed axis of rotation, or the supporting members could make the front roof member 10 carry out a rotary-translation (i.e. a rotation about a mobile axis of rotation).

According to a preferred embodiment, the kinematic mechanisms of the supporting members which carry the roof members 10 and 11 are mechanically connected to one another so as to obtain a single movement of both roof members 10 and 11 which is controlled by a single common actuator that can indifferently be of the hydraulic type or electric type.

When the openable rigid sun roof 8 is arranged in the closed position (shown in FIGS. 1 and 3-4), the two roof members 10 and 11 are arranged substantially horizontal and substantially coplanar with each other in such a way as to be arranged one after the other without interruption. In particular, when the openable rigid sun roof 8 is arranged in the closed position (shown in FIGS. 1 and 3-4), the front roof member 10 is arranged in the front position so as to rest the front end thereof in contact with a windshield 16 of car 1 and so as to arrange the rear end thereof in contact with the front end of the rear roof member 11; moreover, the rear roof member 11 is arranged in the rear position so as to have the front end thereof in contact with the end rear of the front roof member 10 and have the rear end thereof in contact, at the back, with a rear window 17 of car 1 and with the external vertical posts 9 of frame 7.

As mentioned above, in the embodiment shown in the accompanying figures, the two roof members 10 and 11 are not mutually mechanically connected in a direct manner, but they simply rest one onto the other when the openable rigid sun roof 8 is arranged in the closed position (FIGS. 1 and 3-4) and are locked to one another by a dedicated closing system.

Figure 4:
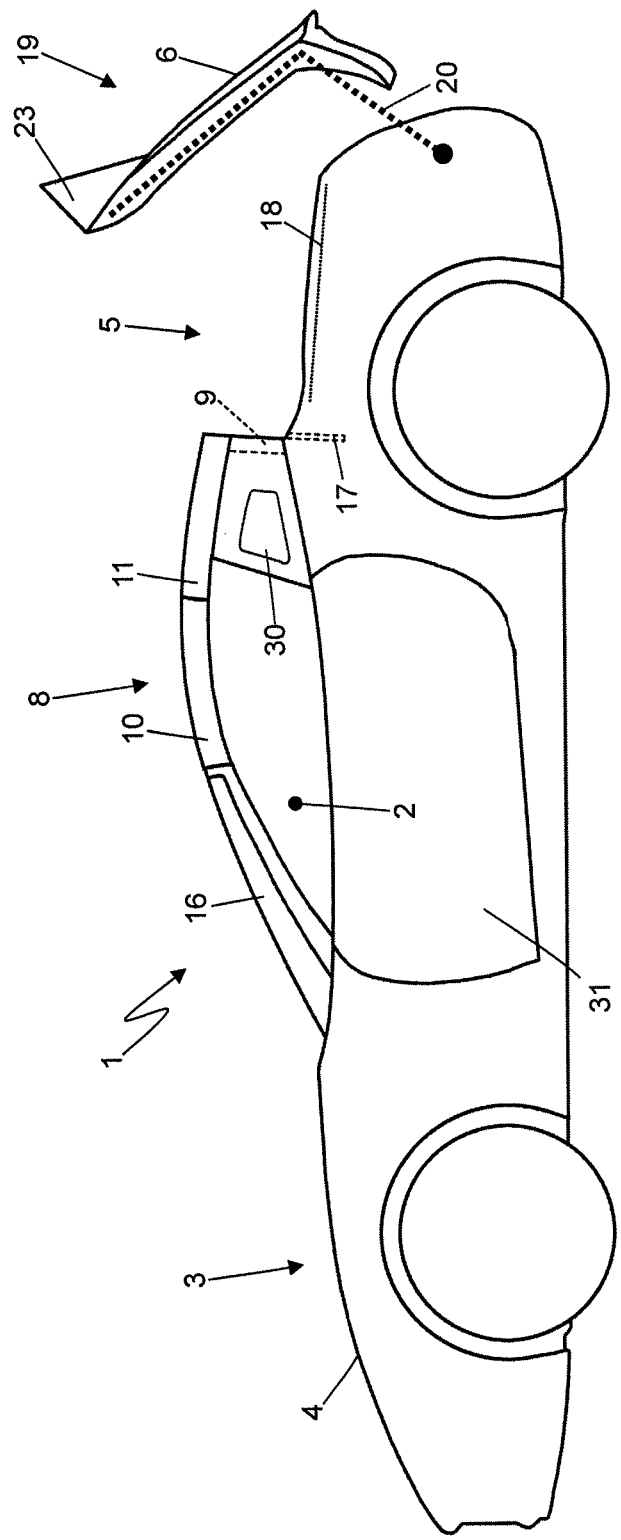

When the openable rigid sun roof 8 is arranged in the open position (shown in FIGS. 2 and 6-7), the two roof members 10 and 11 are arranged inside the baggage compartment 5 (in particular in the upper area of the baggage compartment 5); preferably, a movable partition member 18 is provided which divides the luggage compartment 5 so as to establish a physical separation between the area intended to accommodate the two roof members 10 and 11 and the area available for the baggage. The baggage compartment 5 is closed by a cover 19 which is hinged to frame 7 to move between a closed position (shown in FIGS. 1-3 and 7), in which cover 19 completely closes the baggage compartment 5, and an open position (shown in FIGS. 4-6), in which cover 19 is relatively far from the baggage compartment 5 to allow access to the baggage compartment 5. According to a preferred, but not limiting, embodiment shown in FIG. 4, cover 19 is supported by a pair of support arms 20 (only one of which is shown in FIG. 4) which are L-shaped and are connected to frame 7 by a pair of articulated quadrilaterals in order to carry out a rotary-translation to move between the closed position (shown in FIGS. 1-3 and 7) and the open position (shown in FIGS. 4-6). Cover 19 supports the baggage bonnet 6 which is hinged to cover 19; in other words, the baggage bonnet 6 is integral with cover 19 and moves together with cover 19 when cover 19 is moved between the closed position and the open position. FIG. 8 shows an example of the opening movement of the baggage bonnet 6 which rotates with respect to cover 19 which remains stationary.

Figure 6:
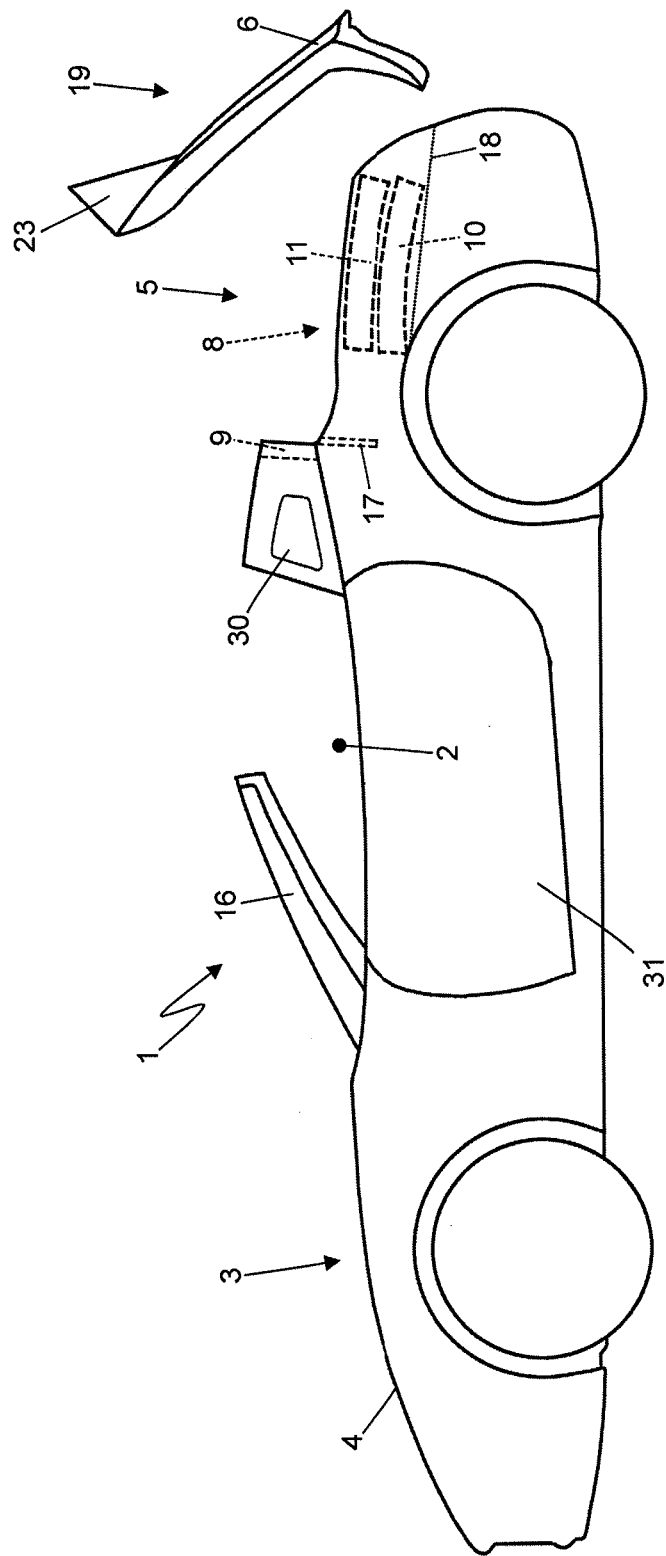
Figure 7:
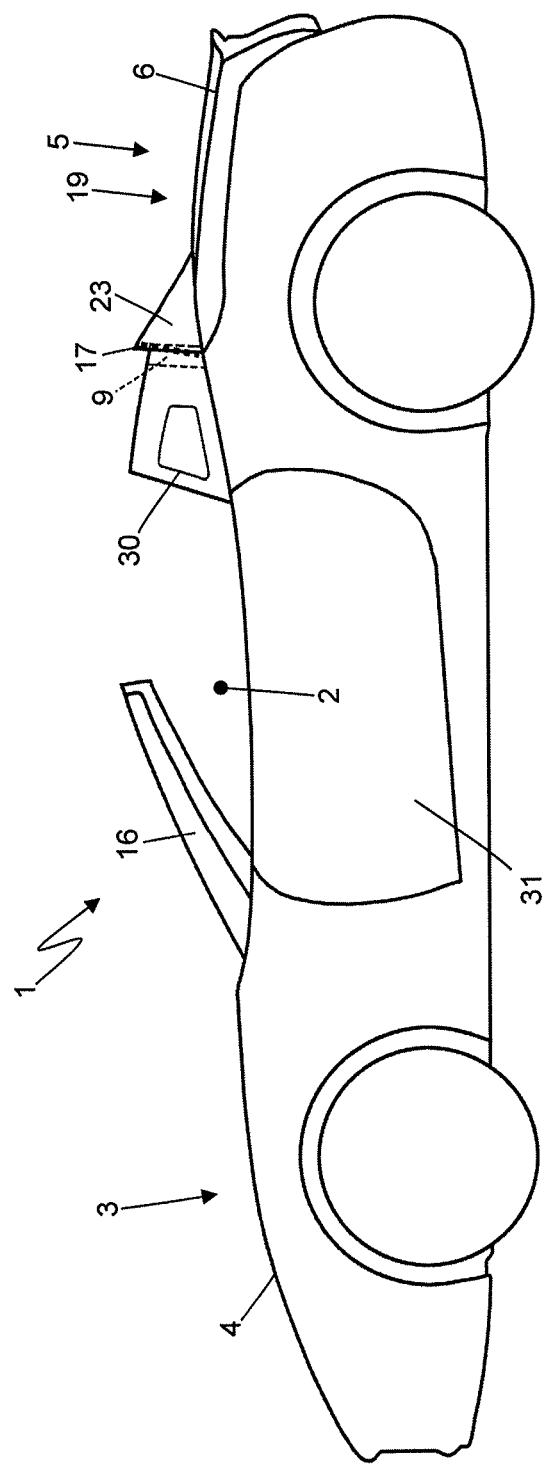

In the baggage compartment 5, the two roof members 10 and 11 are arranged substantially horizontal one on top of the other (as shown in FIG. 6); in other words, the two roof members 10 and 11 in the baggage compartment 5 are vertically packed one on top of the other. According to the preferred, but not limiting, embodiment shown in FIG. 6, the baggage compartment 5 of the rear roof member 11 is arranged on the front roof member 10 and both roof members 10 and 11 have the same type of orientation, i.e. they are arranged with the upper face thereof upwards (in the "natural" orientation they take in use). Such an arrangement of the roof members 10 and 11 in the baggage compartment 5 is particularly advantageous as it maximizes the volume of the baggage compartment 5 when the openable rigid sun roof 8 is in the open position (i.e. when the roof members elements 10 and 11 are arranged inside the baggage compartment 5).

In order to allow the movement of the roof members 10 and 11 to and from the baggage compartment 5, the rear window 17 is movable parallel to along a substantially vertical direction between an extracted position (shown in FIGS. 1-3 and 7), in which the rear window 17 protrudes from the body, and a withdrawn position (shown in FIGS. 4-6) in which the rear window is accommodated inside the body in a respective containment tank 21 (schematically shown in FIGS. 3 and 9) which is formed in a support structure 22 of the rear window 17 (schematically shown in FIGS. 9 and 10) arranged between the baggage compartment 5 and the passenger compartment 2. In use, the rear window 17 is arranged in the withdrawn position both to move the openable rigid sun roof 8 from the closed position to the open position, and to move the openable rigid sun roof 8 from the open position to the closed position, so as to prevent interference with the rotational movement of the roof members 10 and 11.

According to a preferred embodiment, the rear window 17 includes a flat transparent glass, which is arranged substantially vertical (or with suitable inclination to not generate annoying reflections on the inner rearview mirror of car 1) and is supported by two metal brackets slidably mounted on respective guides to move parallel to between the extracted position, in which the rear window 17 protrudes from the body, and the withdrawn position in which the rear window 17 is accommodated into the body in the containment tank 21.

When the openable rigid sun roof 8 is arranged in the closed position, the rear window 17 is generally arranged in the extracted position; however, the driver may decide to arrange the rear window 17 in the withdrawn position to increase the ventilation of the passenger compartment 2. When the openable rigid sun roof 8 is arranged in the open position, the rear window 17 is generally arranged in the withdrawn position; however, the driver may decide to arrange the rear window 17 in the extracted position to use the rear window 17 as windbreak and thereby reduce the turbulence into the passenger compartment 2.

Preferably, cover 19 has a pair of fins 23, which are arranged on opposite sides of cover 19 and lay against the external vertical posts 9 when cover 19 is in a closed position of the baggage compartment 5.

As shown in FIG. 9, structure 22 for supporting the rear window 17 is supported by two internal fixed vertical posts 24 of frame 7 which constitute the lateral walls of the support structure 22 (in other words, the support structure 22 is built on two internal vertical posts 24 which laterally delimit the support structure 22). As shown in FIG. 8, the two internal vertical posts 24 are arranged between the external vertical posts 9 and at a given distance from the external vertical posts, so as to define, between each external vertical post 9 and the corresponding internal vertical post 24, a hollow space 25, that is, a technical space intended to accommodate functional parts of the openable rigid sun roof 8. Also the internal vertical posts 24 are rigidly connected to the remainder of frame 7 in a fixed position (i.e. they have no kind of movement with respect to the remainder of frame 7).

According to a preferred embodiment, the support organs of the roof members 10 and 11 are arranged in the two hollow spaces 25; therefore, in the embodiment shown in the accompanying figures, arms 14 of the front roof member 10 are arranged in the two hollow spaces 25 which in turn support the articulated quadrilaterals 15 of the rear roof member 11. As shown in FIG. 8, each pair of vertical posts 9 and 24 (i.e. each pair consisting of an external vertical post 9 and of the corresponding internal vertical post 24) comprises a structural connection 26 which is arranged vertically and is connected at the ends thereof to the two vertical posts 9 and 24 (for example, but not necessarily, by means of screws 27). Each structural connection 26 has both the structural function of strengthening this area of frame 7 (in other words, thanks to the structural connection 26, the corresponding vertical posts 9 and 24 form a single structure), and the function of providing an anchoring point for the bearing member 12 which supports the roof members 10 and 11.

When the openable rigid sun roof 8 is in the closed position, the rear roof member 11 superiorly covers the hollow spaces 25 and rests with the interposition of seals on an upper wall 28 of each external vertical post 9 of frame 7 and on an upper wall 29 of each internal vertical post 24 of frame 7.

As shown in FIG. 8, the external vertical posts 9 and the internal vertical posts 24 can also together carry out the function of roll-bar in the event of overturning of car 1. In particular, the internal vertical posts 24 are higher than the external vertical posts 9 (i.e. the upper walls 29 of the internal vertical posts 24 are arranged higher than the upper walls 28 of the external vertical posts 9); in this way, in case of overturning of car 1, the external vertical posts 9 primarily have the function of transversal roll-bar (i.e. they laterally protect the occupants of the passenger compartment 2) and the internal vertical posts primarily have the function of vertical roll-bar (i.e. they superiorly protect the occupants of the passenger compartment 2). The structural connections 26, by connecting the vertical posts 9 and 24 to each other, allow both vertical posts 9 and 24 to be strengthened and thus allow both the lateral protection (essentially ensured by the external vertical posts 9) and top protection (essentially ensured by the internal vertical posts 24) to be increased.

Thanks to the fact that the external vertical posts 9 are arranged more outwards of the seats, the structure composed of the vertical posts 9 and 24 ensures a better protection in the early stages of an overturning compared to the solutions commonly adopted, in which the roll bars are normally positioned in alignment with the seats.

As shown in FIGS. 1-7, a pair of lateral glasses 30 is provided, which project from the belt line of car 1, are arranged facing each other on opposite sides of car 1, lay posteriorly (i.e. at a rear area) and transversely (i.e. in a transverse direction, i.e. lateral) on the corresponding external vertical posts 9 and constitute a lateral delimitation of the passenger compartment 2. In the practice, and as clearly shown in FIG. 10, each lateral glass 30 lays transversely (laterally) on the corresponding external vertical post 9 and develops along the side of car 1 to laterally delimit the passenger compartment 2 in the vicinity of the rear window 17 (that is, in the vicinity of the two external vertical posts 9). Preferably, a lateral internal surface (that is, directed towards compartment 2) of each lateral glass 30 is arranged in contact with an external lateral surface of the corresponding external vertical post 9; in other words, each lateral glass 30 laterally covers the corresponding external vertical post 9 so that the external vertical post 9 is laterally hidden from view by the lateral glass 30.

According to a preferred embodiment shown in the accompanying Figures, each lateral glass 30 is transparent, or is made of a transparent material which may be glass or plastic (polycarbonate).

When the openable rigid sun roof 8 is arranged in the closed position (shown in FIGS. 1 and 3-4), the rear roof member 10, on the rear side, lays against an upper edge of the rear window 17 and on the upper walls 28 of the external vertical posts 9 and laterally lays on upper walls of the lateral glasses 30.

According to a preferred embodiment, two (and only two) doors 31 are provided, which allow access to the passenger compartment 2, and two side windows, each of which is mounted vertically movable in a corresponding door 31 and posteriorly and slidably lays against a lateral glass 30. In other words, each lateral glass 30 is frontally provided with a guide along which a corresponding window carried by a door 31 slides. Accordingly, the two glasses 30 are arranged staggered and longitudinally more backwards with respect to doors 31 so that below each glass 30 there is a fixed part (i.e. not openable) of the body.

Figure 11:
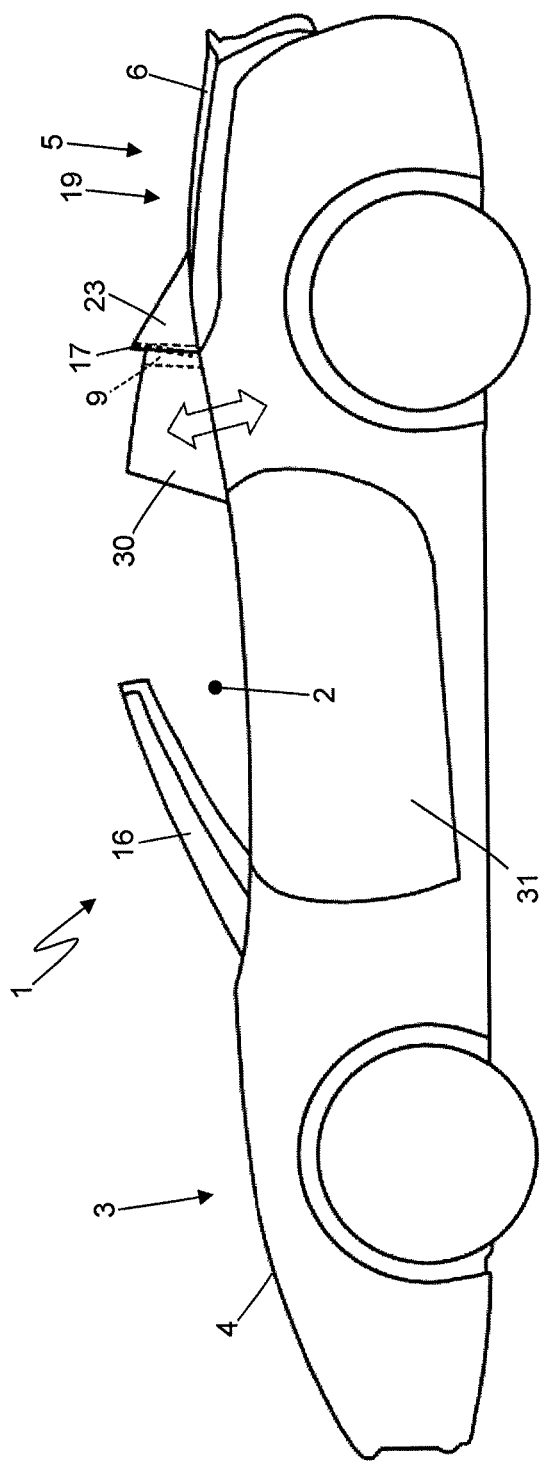
FIGS. 11 and 12 are two schematic lateral views of a variant of the car in FIG. 1.
Figure 12:
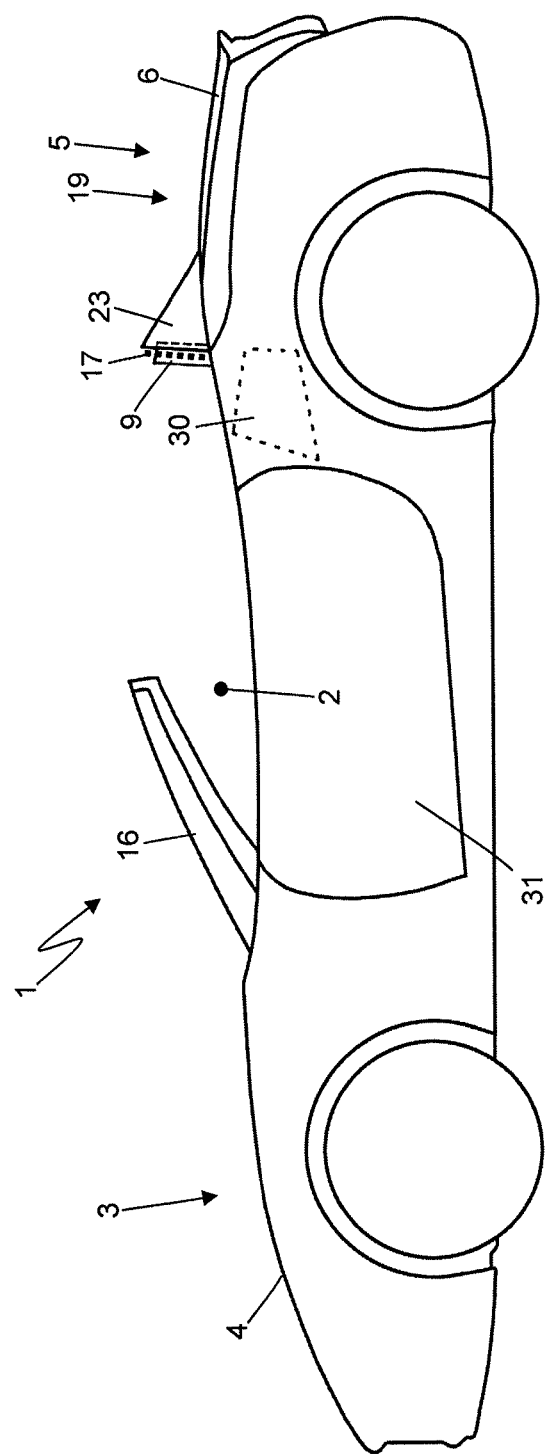

According to a possible embodiment shown in FIGS. 1-7, each lateral glass 30 is fixed and is rigidly and permanently connected to the corresponding external vertical post 9; in other words, each lateral glass 30 has no movement and always remains in the position shown in FIGS. 1-7. In this embodiment, each lateral glass 30 is carried by an annular frame which runs all around the lateral glass 30, is rigidly fixed to frame 7, and is hidden to view by a silkscreen printing printed on the lateral glass 30 (clearly visible in FIGS. 1-7). According to a different embodiment shown in FIGS. 11 and 12, each lateral glass 30 is mounted in a mobile manner so as to vertically slide between an extracted position (shown in FIG. 11), in which the lateral glass 30 projects from the belt line of car 1, and a withdrawn position (shown in FIG. 12), in which the lateral glass 30 is hidden under the belt line of car 1. In this embodiment, each lateral glass 30 on the rear side lays against the corresponding external vertical post 9 in a sliding manner. Furthermore, in this embodiment, each lateral glass 30 has no frame and therefore corresponding silkscreen printing; i.e. in this embodiment each lateral glass 30 is completely transparent in all its parts.

According to a preferred embodiment shown in FIG. 10, each external vertical post 9 is provided with a seal 32 which is interposed between the external vertical post 9 and the corresponding fin 23 when fin 23 lays against the external vertical post 9; the function of seals 32 is to seal the contact between the external vertical posts 9 and fins 23 to prevent water infiltration.

Figure 13:
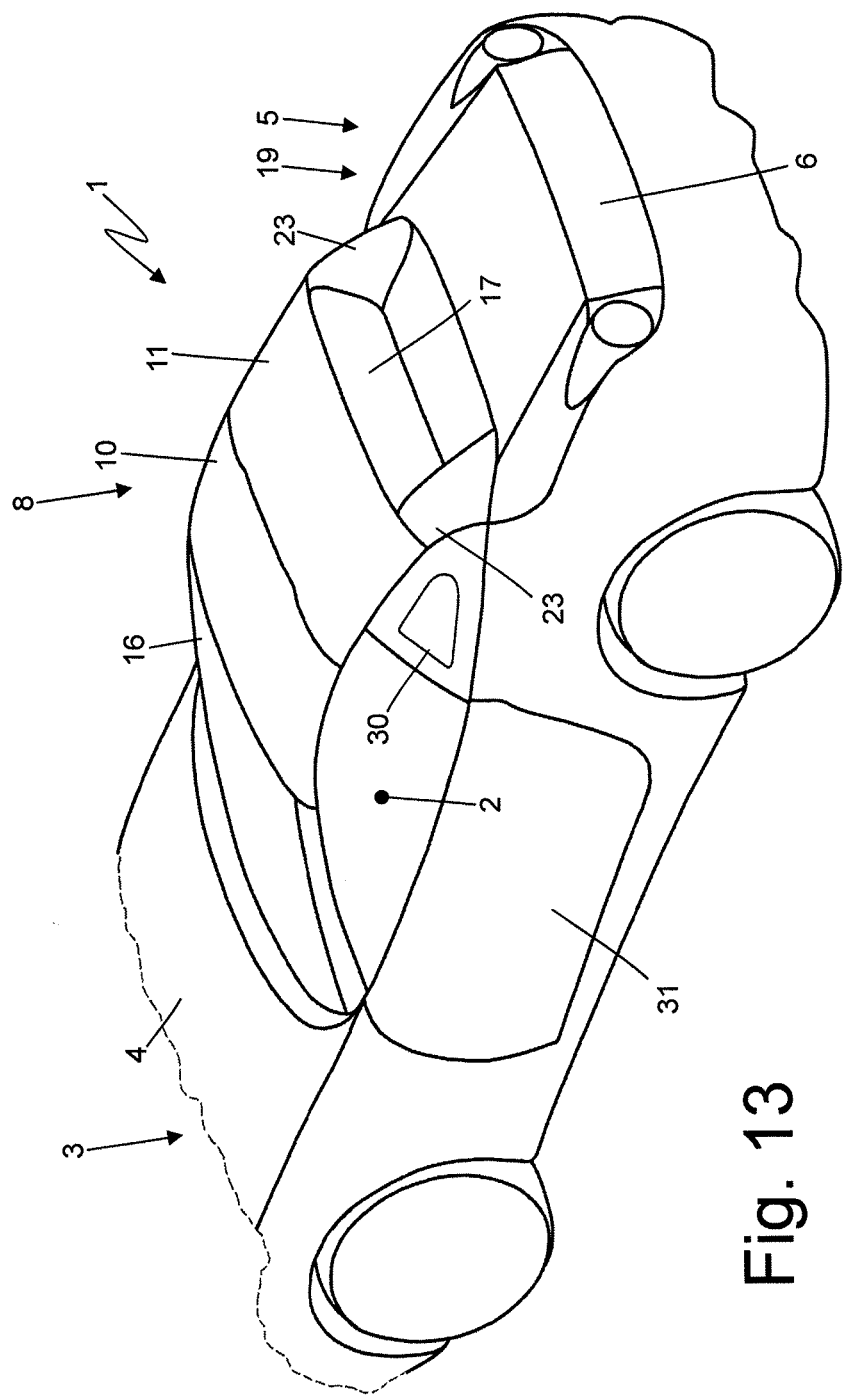
FIGS. 13 and 14 are two schematic perspective views of two further variants of the car in FIG. 1.
Figure 14:
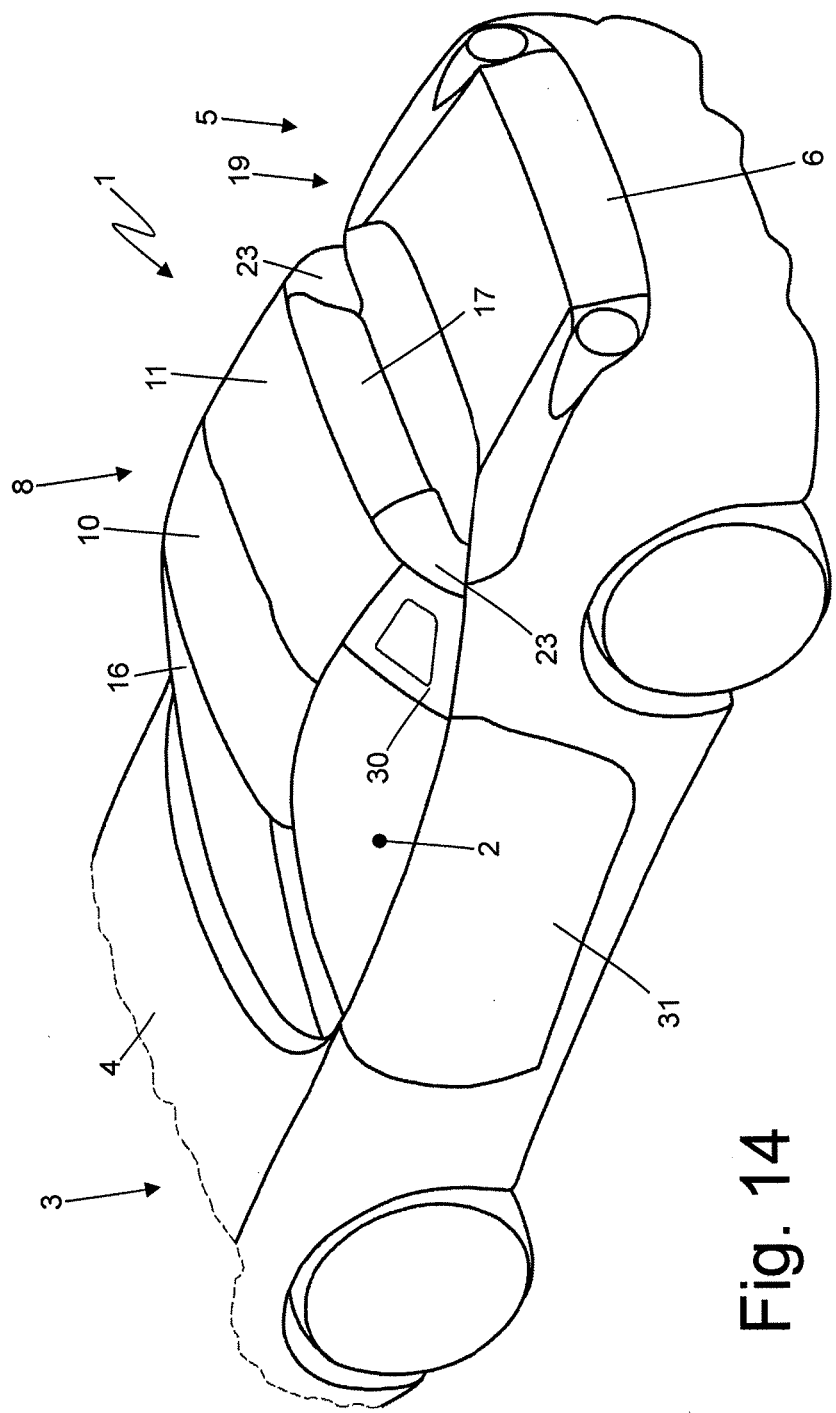

FIGS. 13 and 14 show two alternative embodiments of the lateral glasses 30 and of fins 23. In the embodiment shown in FIG. 13, the lateral glasses 30 have a greater longitudinal development, i.e. the lateral glasses 30 are elongated towards the back, taking an arrow shape (rather than the truncated shape shown in FIGS. 1-12). In the embodiment shown in FIG. 14, fins 23 have a very limited longitudinal extension.

The openable rigid sun roof 8 described above has many advantages, as it is simple and cost-effective to be implemented and in the folded position it has very limited dimensions.

Moreover, thanks to the openable rigid sun roof 8 described above, the passenger compartment 2 can have a large volume in the rear area thereof (especially in the vertical direction) and thus can also accommodate rear seats, while maintaining well balanced and thus aesthetically pleasing overall proportions of the body.

The total volume of the baggage compartment 5 is significant (especially when the openable rigid sun roof 8 is in the open position) and definitely much larger than the baggage compartment of a similar conventional car. In this way, the baggage bonnet 6 can be arranged in a relatively low position (i.e. lower than a similar car with a conventional openable sun roof), thus imparting a vertically slender shape to the rear of car 1 which is aesthetically very much appreciated.

In the openable rigid sun roof 8 described above, the movable parts (i.e. the roof members 10 and 11) are much smaller (especially narrower) than a similar conventional sun roof; in this way, the openable rigid sun roof 8 described above has a significantly reduced overall weight which can be up to half of the total weight of a similar conventional openable sun roof. Moreover, in this way, the transverse dimensions of the roof members 10 and 11 within the baggage compartment 5 is definitely more limited (even by 10-15 cm) than the transversal dimension of a similar conventional openable sun roof and therefore it is possible to have the mudflaps transversely closer to impart a transversely slender and tapered shape to the back of car 1 which is aesthetically very much appreciated.

The openable rigid sun roof 8 described above has reduced production costs compared to a similar conventional openable sun roof, since the moving parts are definitely less than a similar conventional openable sun roof.

The openable rigid sun roof 8 described above has a total time of operation (i.e. a time required to change from the closed position to the open position and vice versa) which is certainly short; in fact, the total time of operation of the openable rigid sun roof 8 described above may even be 30-40% less than the total time of operation of a similar conventional openable sun roof.

Finally, the openable rigid sun roof 8 described above is extremely reliable, as it allows the manufacturing defects and the mechanical wear to be minimized thanks to the intrinsically simple structure of the openable rigid sun roof 8.

What is claimed is:

1. A car comprising:
    a car body having a belt line;
    a passenger compartment;
    two doors which allow access to the passenger compartment and are provided with respective lateral windows, each of which is vertically movably mounted in a corresponding door;
    a frame provided with two external fixed vertical posts, which are rigidly connected to a remainder of the frame in a fixed position which never changes, extend upwards from the belt line of the car, face each other on opposite sides of the car, and constitute a rear delimitation of the passenger compartment;
    a rigid sun roof, which is supported by the frame and can be set to an open position or a closed position with respect to the passenger compartment;
    a baggage compartment, which is arranged in a rear position and contains the rigid sun roof, when the rigid sun roof is arranged in the open position;
    a mobile cover, which is independent and separate from the sun roof and closes the baggage compartment both when the sun roof is in the open position and when the sun roof is in the closed position; and
    a rear window, which is arranged between the two external vertical posts and is mounted in a sliding manner so as to move between an extracted position, in which the rear window projects from the car body, and a withdrawn position, in which the rear window is housed inside the car body;
    wherein the rigid sun roof comprises two rigid roof members which, when the rigid sun roof is in the closed position, are substantially horizontal and substantially coplanar to each other and positioned one behind the other, and, when the rigid sun roof is in the open position, are arranged one on top of the other inside the baggage compartment; and
    wherein the car comprises two lateral glasses, which:
        a) are arranged longitudinally more rearwards with respect to the doors so that underneath each glass there is a fixed part of the car body,
        b) are separate and independent from the lateral windows of the doors and frontally and slidably lay on the corresponding lateral windows,
        c) extend upwards from the beltline, face each other on opposite sides of the car, and constitute a lateral delimitation of the passenger compartment,
        d) transversally lay against a corresponding external vertical posts, and a lateral internal surface of each lateral glass is arranged in contact with an external lateral surface of the corresponding external vertical post so that each lateral glass laterally covers the corresponding external vertical post.

2. A car according to claim 1, wherein, when the rigid sun roof is arranged in the closed position, the rear roof element, on the rear side, lays against an upper edge of the rear window and on upper walls of the external vertical posts and laterally lays on upper walls of the two lateral glasses.

3. A car according to claim 1, wherein each lateral glass is a continuation of the corresponding external vertical post, is arranged along the side of the car, and laterally delimit the passenger compartment close to the rear window.

4. A car according to claim 1, wherein the two lateral glasses are transparent.

5. A car according to claim 1, wherein each lateral glass is fixed as well as rigidly and permanently connected to a corresponding external vertical post.

6. A car according to claim 1, wherein each lateral glass is mounted in a mobile manner and is able to vertically slide between an extracted position, in which the lateral glass projects from the belt line, and a withdrawn position, in which the lateral glass is hidden under the belt line.

7. A car according to claim 6, wherein each lateral glass, on the rear side, lays against a corresponding external vertical post in a sliding manner.

8. A car according to claim 1, wherein a bonnet, which allows access to the baggage compartment, is hinged to the cover and moves, together with the cover, when the cover is moved.

9. A car according to claim 1, wherein the frame comprises two internal fixed vertical posts, which are arranged between the external vertical posts at a distance from the external vertical posts, so as to define, between each external vertical post and a corresponding internal vertical post, a hollow space.

10. A car comprising:
    a car body having a belt line;
    a passenger compartment;
    two doors which allow access to the passenger compartment and are provided with respective lateral windows, each of which is vertically movably mounted in a corresponding door;
    a frame provided with two external fixed vertical posts, which are rigidly connected to a remainder of the frame in a fixed position, extend upwards from the belt line of the car, face each other on opposite sides of the car, and constitute a rear delimitation of the passenger compartment;

a rigid sun roof, which is supported by the frame and can be set to an open position or a closed position with respect to the passenger compartment;

a baggage compartment, which is arranged in a rear position and contains the rigid sun roof, when the rigid sun roof is arranged in the open position;

a mobile cover to close the baggage compartment; and a rear window, which is arranged between the two external vertical posts and is mounted in a sliding manner so as to move between an extracted position, in which the rear window projects from the car body, and a withdrawn position, in which the rear window is housed inside the car body;

wherein the rigid sun roof comprises two rigid roof members which, when the rigid sun roof is in the closed position, are substantially horizontal and substantially coplanar to each other and positioned one behind the other, and, when the rigid sun roof is in the open position, are arranged one on top of the other inside the baggage compartment; and wherein the car comprises two transparent lateral glasses, which:
   a) are arranged longitudinally more rearwards with respect to the doors so that underneath each glass there is a fixed part of the car body,
   b) are separate and independent from the lateral windows of the doors and frontally and slidably lay on the corresponding lateral windows,
   c) extend upwards from the beltline, face each other on opposite sides of the car, and constitute a lateral delimitation of the passenger compartment,
   d) transversally lay against a corresponding external vertical posts, and a lateral internal surface of each lateral glass is arranged in contact with an external lateral surface of the corresponding external vertical post so that each lateral glass laterally covers the corresponding external vertical post.

11. A car according to claim 10, wherein, when the rigid sun roof is arranged in the closed position, the rear roof element, on the rear side, lays against an upper edge of the rear window and on upper walls of the external vertical posts and laterally lays on upper walls of the two lateral glasses.

12. A car according to claim 10, wherein each lateral glass is a continuation of the corresponding external vertical post, is arranged along the side of the car, and laterally delimit the passenger compartment close to the rear window.

13. A car according to claim 10, wherein each lateral glass is fixed as well as rigidly and permanently connected to a corresponding external vertical post.

14. A car according to claim 10, wherein each lateral glass is mounted in a mobile manner and is able to vertically slide between an extracted position, in which the lateral glass projects from the belt line, and a withdrawn position, in which the lateral glass is hidden under the belt line.

15. A car according to claim 14, wherein each lateral glass, on the rear side, lays against a corresponding external vertical post in a sliding manner.

16. A car according to claim 10, wherein a bonnet, which allows access to the baggage compartment, is hinged to the cover and moves, together with the cover, when the cover is moved.

17. A car according to claim 10, wherein the frame comprises two internal fixed vertical posts, which are arranged between the external vertical posts at a distance from the external vertical posts, so as to define, between each external vertical post and a corresponding internal vertical post, a hollow space.

18. A car comprising:
a car body having a belt line;
a passenger compartment;
two doors which allow access to the passenger compartment and are provided with respective lateral windows, each of which is vertically movably mounted in a corresponding door;
a frame provided with two external fixed vertical posts, which are rigidly connected to a remainder of the frame in a fixed position, extend upwards from the belt line of the car, face each other on opposite sides of the car, and constitute a rear delimitation of the passenger compartment;
a rigid sun roof, which is supported by the frame and can be set to an open position or a closed position with respect to the passenger compartment;
a baggage compartment, which is arranged in a rear position and contains the rigid sun roof, when the rigid sun roof is arranged in the open position;
a mobile cover to close the baggage compartment; and
a rear window, which is arranged between the two external vertical posts and is mounted in a sliding manner so as to move between an extracted position, in which the rear window projects from the car body, and a withdrawn position, in which the rear window is housed inside the car body;

wherein the frame comprises two internal fixed vertical posts, which are arranged between the external vertical posts at a distance from the external vertical posts, so as to define, between each external vertical post and a corresponding internal vertical post, a hollow space;

wherein the rigid sun roof comprises two rigid roof members which, when the rigid sun roof is in the closed position, are substantially horizontal and substantially coplanar to each other and positioned one behind the other, and, when the rigid sun roof is in the open position, are arranged one on top of the other inside the baggage compartment; and wherein the car comprises two lateral glasses, which:
   a) are arranged longitudinally more rearwards with respect to the doors so that underneath each glass there is a fixed part of the car body,
   b) are separate and independent from the lateral windows of the doors and frontally and slidably lay on the corresponding lateral windows,
   c) extend upwards from the beltline, face each other on opposite sides of the car, and constitute a lateral delimitation of the passenger compartment,
   d) transversally lay against a corresponding external vertical posts, and a lateral internal surface of each lateral glass is arranged in contact with an external lateral surface of the corresponding external vertical post so that each lateral glass laterally covers the corresponding external vertical post.

19. A car according to claim 18, wherein, when the rigid sun roof is arranged in the closed position, the rear roof element, on the rear side, lays against an upper edge of the rear window and on upper walls of the external vertical posts and laterally lays on upper walls of the two lateral glasses.

20. A car according to claim 18, wherein each lateral glass is a continuation of the corresponding external vertical post, is arranged along the side of the car, and laterally delimit the passenger compartment close to the rear window.

21. A car according to claim 18, wherein the two lateral glasses are transparent.

22. A car according to claim 18, wherein each lateral glass is fixed as well as rigidly and permanently connected to a corresponding external vertical post.

23. A car according to claim 18, wherein each lateral glass is mounted in a mobile manner and is able to vertically slide between an extracted position, in which the lateral glass projects from the belt line, and a withdrawn position, in which the lateral glass is hidden under the belt line.

24. A car according to claim 23, wherein each lateral glass, on the rear side, lays against a corresponding external vertical post in a sliding manner.

25. A car according to claim 18, wherein a bonnet, which allows access to the baggage compartment, is hinged to the cover and moves, together with the cover, when the cover is moved.

* * * * *